(12) United States Patent
Komatsuzaki et al.

(10) Patent No.: US 10,286,548 B2
(45) Date of Patent: May 14, 2019

(54) ROBOT CONTROL SYSTEM AND RECORDING MEDIUM

(71) Applicant: FUJI XEROX CO., LTD., Tokyo (JP)

(72) Inventors: Kazunari Komatsuzaki, Yokohama (JP); Roshan Thapliya, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 182 days.

(21) Appl. No.: 15/347,391

(22) Filed: Nov. 9, 2016

(65) Prior Publication Data

US 2017/0334063 A1     Nov. 23, 2017

(30) Foreign Application Priority Data

May 23, 2016 (JP) ................................ 2016-102244

(51) Int. Cl.
| | |
|---|---|
| *B25J 9/00* | (2006.01) |
| *B25J 11/00* | (2006.01) |
| *B25J 9/16* | (2006.01) |
| *G05G 1/00* | (2006.01) |
| *G05B 19/418* | (2006.01) |
| *G05D 1/00* | (2006.01) |

(52) U.S. Cl.
CPC ............ *B25J 9/0084* (2013.01); *B25J 9/162* (2013.01); *B25J 9/1682* (2013.01); *B25J 11/0005* (2013.01); *G05B 19/41895* (2013.01); *G05D 1/0027* (2013.01); *G05B 2219/39146* (2013.01); *G05B 2219/50393* (2013.01); *Y02P 90/285* (2015.11); *Y02P 90/60* (2015.11)

(58) Field of Classification Search
CPC ........ B25J 9/0084; B25J 9/162; B25J 9/1682; B25J 11/0005; B25J 9/0003; B25J 9/1656; G05B 19/41895; G05B 2219/39146; G05B 2219/50393; G05B 19/19; G05B 19/418; G05B 2219/39163; G05B 2219/39152; G05B 2219/39167; G05D 1/0027; G05D 1/0217; Y02P 90/285; Y02P 90/60; Y02P 901/01
USPC ...................................... 700/248, 250; 901/1
See application file for complete search history.

(56) References Cited

U.S. PATENT DOCUMENTS 6,408,226 B1 *  6/2002  Byrne .................. G05D 1/0246
                                                318/568.11
6,577,906 B1 *  6/2003  Hurtado ........... G05B 19/41865
                                                700/19

(Continued)

FOREIGN PATENT DOCUMENTS

| | | |
|---|---|---|
| JP | 2933247 B2 | 8/1999 |
| JP | 4254588 B2 | 4/2009 |

OTHER PUBLICATIONS

Aug. 11, 2017 Extended Search Report issued in European Patent Application No. 16202884.9.

*Primary Examiner* — Bao Long T Nguyen
(74) *Attorney, Agent, or Firm* — Oliff PLC

(57) ABSTRACT

A robot control system includes: plural robots that are disposed in a region; a generating unit that divides the region into plural small regions and generates disposition position information for specifying disposition positions of each of the plural robots in the region based on a value indicating a use possibility of a robot in each small regions; and a disposition unit that disposes the plural robots in the region in accordance with the disposition position information generated by the generating unit.

10 Claims, 11 Drawing Sheets

(56) References Cited

U.S. PATENT DOCUMENTS

| | | | |
|---|---|---|---|
| 2005/0256610 A1* | 11/2005 | Orita | G05D 1/0088 |
| | | | 700/248 |
| 2006/0112034 A1 | 5/2006 | Okamoto et al. | |
| 2010/0312388 A1* | 12/2010 | Jang | G05D 1/0088 |
| | | | 700/248 |
| 2011/0004340 A1* | 1/2011 | Osada | B23P 21/004 |
| | | | 700/248 |
| 2012/0232695 A1* | 9/2012 | Ghose | G01T 7/00 |
| | | | 700/248 |
| 2013/0123980 A1* | 5/2013 | Seo | B25J 9/1669 |
| | | | 700/248 |
| 2014/0163730 A1* | 6/2014 | Mian | B25J 9/16 |
| | | | 700/248 |
| 2014/0365258 A1 | 12/2014 | Vestal et al. | |
| 2015/0073594 A1* | 3/2015 | Trujillo | B25J 5/02 |
| | | | 700/248 |
| 2015/0251316 A1* | 9/2015 | Smith | G05B 19/41815 |
| | | | 700/248 |

* cited by examiner

FIG. 8

| ROBOT USE AMOUNT FOR PAST ONE MONTH | ROBOT USE HISTORY PARAMETER |
|---|---|
| 0 | +0.1 |
| ~1 HOUR | +1.0 |
| ~5 HOURS | +2.0 |

413A

| LARGE ITEM CONVERSION TABLE | | DETAILED ITEM CONVERSION TABLE | |
|---|---|---|---|
| NO SCHEDULE REGISTRATION | +0.5 | | |
| DESK WORK | +0.2 | PROGRAMMING | +0.0 |
| | | PAPERWORK | +0.1 |
| | | DESIGN | +0.3 |
| MEETING | +0.7 | WEEKLY BRIEFING | −0.2 |
| | | NEGOTIATION | +0.3 |
| | | BRAIN STORMING | +0.5 |
| EXPERIMENT | +0.3 | USER STUDY | −0.1 |
| | | ELECTRICAL CIRCUIT TEST | +0.0 |
| | | MF ENDURANCE TEST | +0.1 |

413B-1   413B-2   413B

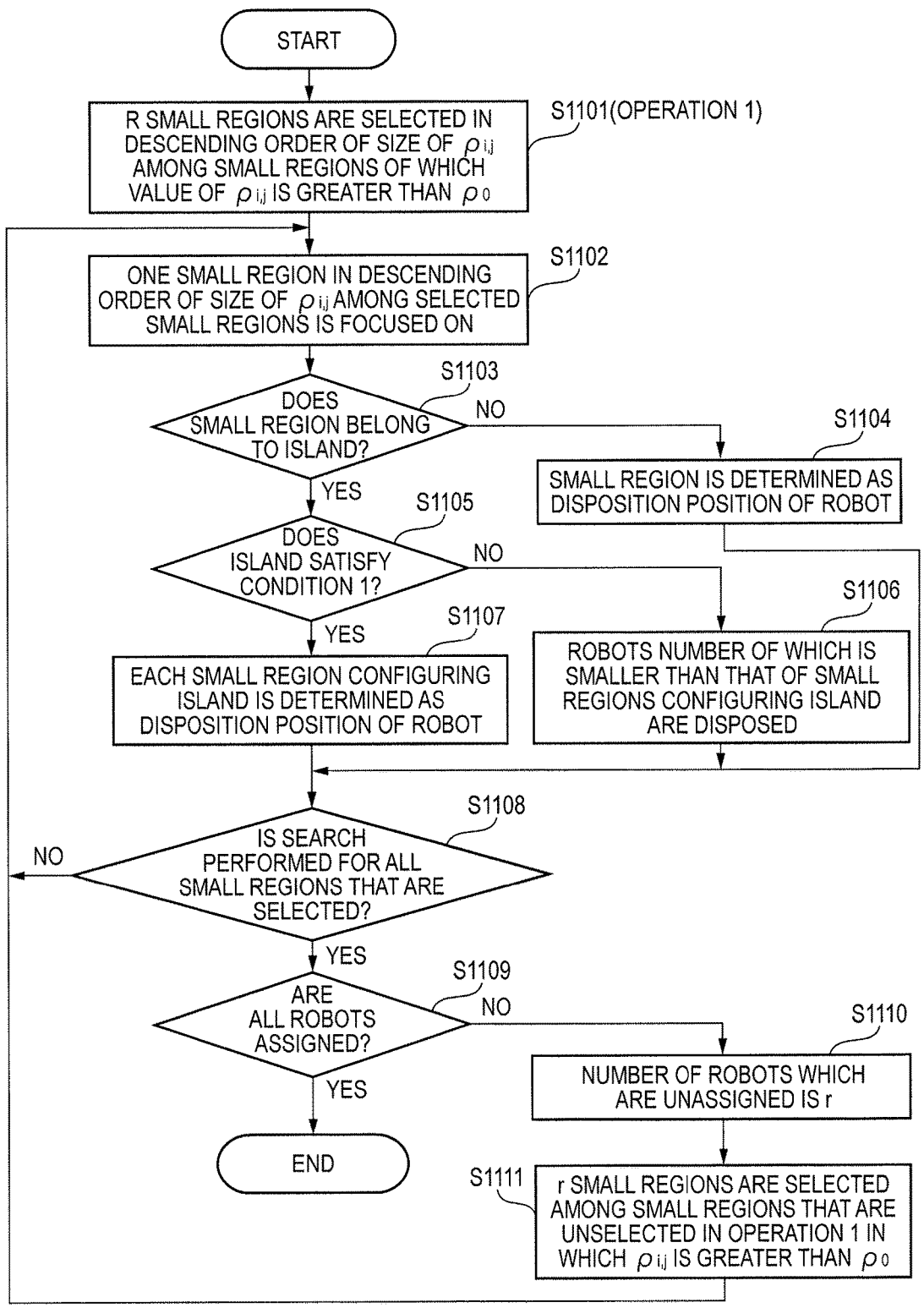

ROBOT CONTROL SYSTEM AND RECORDING MEDIUM

CROSS-REFERENCE TO RELATED APPLICATIONS

This application is based on and claims priority under USC 119 from Japanese Patent Application No. 2016-102244, filed on May 23, 2016.

BACKGROUND

Technical Field

The present invention relates to a robot control system and a recording medium.

SUMMARY

According to an aspect of the invention, there is provided a robot control system including: plural robots that are disposed in a region; a generating unit that divides the region into plural small regions and generates disposition position information for specifying disposition positions of each of the plural robots in the region based on a value indicating a use possibility of a robot in each small region; and a disposition unit that disposes the plural robots in the region in accordance with the disposition position information generated by the generating unit.

BRIEF DESCRIPTION OF THE DRAWINGS

Exemplary embodiment(s) of the present invention will be described in detail based on the following figures, wherein:

FIG. 8 is a diagram illustrating a conversion table 413 which is referred by an estimated robot use amount calculating unit during a calculating process of an estimated robot use amount;

FIG. 11 is a flowchart illustrating another example of a robot disposition position determining process.

DETAILED DESCRIPTION

Figure 1:
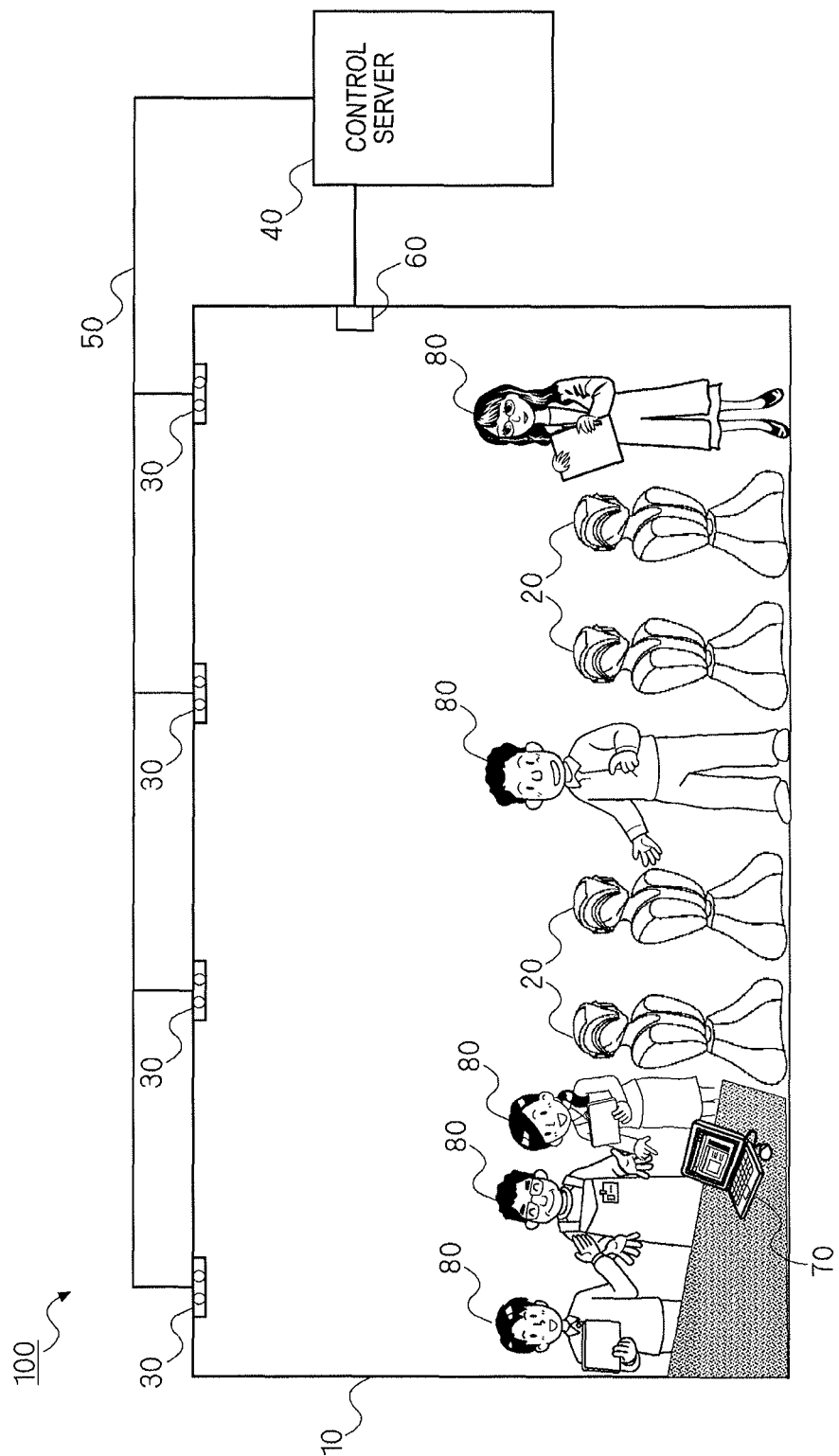
FIG. 1 is an entire schematic view illustrating an example of a robot control system 100 according to an exemplary embodiment of the invention.

A robot control system of an exemplary embodiment of the invention will be described with reference to FIG. 1. A robot control system 100 of the exemplary embodiment is configured to include plural robots 20 that are disposed in a relatively large predetermined region 10 (hereinafter, referred to as a workplace) such as one floor (one story) of an office building, plural environmental sensors 30 that are disposed on a ceiling, a wall, or the like of the workplace 10, and a control server 40. The control server 40 is connected to each robot 20 and the environmental sensors 30 by a network 50. Particularly, the control server 40 and each robot 20 are connected by radio via an access point 60 disposed on the wall surface or the like of the workplace 10.

In addition, plural computers 70 are disposed in the workplace 10 and are connected to the control server 40 via the access point 60. Scheduling application software is installed in the computer 70. Plural persons 80 exist in the workplace 10 and in the exemplary embodiment, the persons 80 are office workers performing business in the workplace 10. Each person 80 registers schedule data of him using the scheduling application software installed in the computer 70 and the registered schedule data is stored in a schedule database of the control server 40.

Moreover, in the following description, in order to easily perform the description, a case where the robots 20 disposed in the workplace 10 are all the same interactive robots is described as an example. However, the robot 20 of the invention is not limited to the interactive robot and may be any one of other forms of robots, for example, a service execution robot such as a transport robot, a table robot, a robot for providing a lighting tool, and an interactive screen robot. In addition, the interactive robot and the service execution robot may be mixed or only various types of the service execution robots may be mixed.

Figure 2:
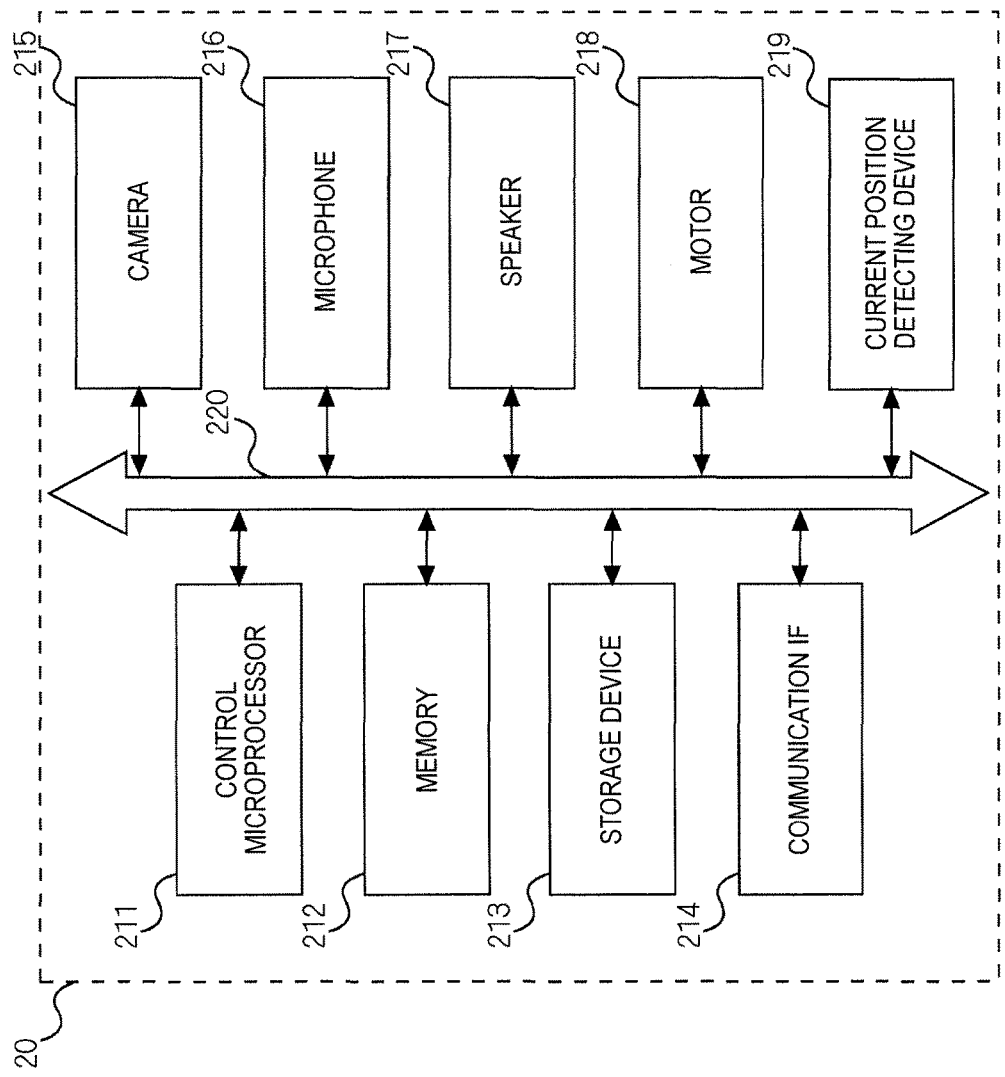
FIG. 2 is a configuration diagram illustrating hardware of a robot 20.

Here, the robot 20 of the exemplary embodiment will be described with reference to FIGS. 2 and 3. FIG. 2 is a configuration diagram illustrating hardware of the robot 20. As illustrated in FIG. 2, the robot 20 is configured to include a control microprocessor 211, a memory 212, a storage device 213 such as a hard disk drive (HDD) or a solid state drive (SSD), a communication interface 214, a camera 215, a microphone 216, a speaker 217, a motor 218, and a current position detecting device 219, and each thereof is connected to a control bus 220.

The control microprocessor 211 controls overall operations of each portion of the robot 20 based on a control program stored in the storage device 213. A voice of dialogue and contents of the dialogue during the dialogue in which the robot 20 is carried out with a user, images of a facial expression, a behavior, a state of the body of the user 50, and the like that are photographed by the camera 215 are temporarily stored in the memory 212. A control program for controlling each portion of the robot 20 is stored in the storage device 213. The communication interface 214 performs communication control with which the robot 20 performs communication with the control server 40 or other robots 20 via the access point 60.

The camera 215 photographs the facial expression, the behavior, a change of the state of the body of the user, and the like, and stores those in the memory 212. The microphone 216 detects the voice of the user and stores, that is, records the voice in the memory 212 when performing dialogue with the user. The contents of the dialogue may be stored in the memory 212 after interpreting the contents of the voice without directly recording the voice. The speaker 217 outputs a voice generated by a dialogue controller of the robot 20 that is described below. The motor 218 moves the robot 20 to a predetermined disposition position based on movement control information generated in a movement controller that is described below. The current position detecting device 219 is configured to include a GPS signal receiving device, a position information signal receiving device, and the like, and specifies a current position of the robot 20, and temporarily stores the current position thereof in the memory 212.

Figure 3:
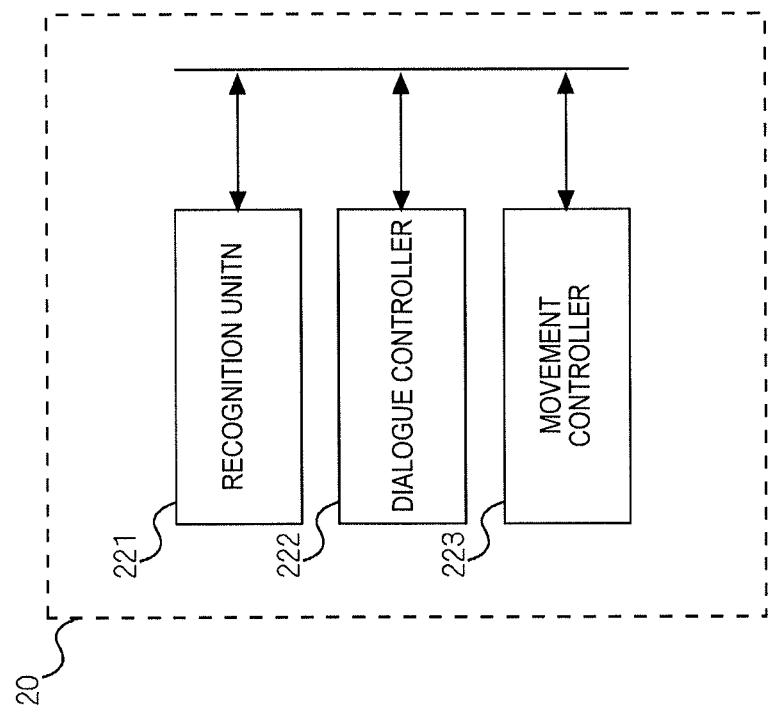
FIG. 3 is a block diagram of a function of the robot 20.

FIG. 3 is a block diagram of a function of the robot 20. As illustrated in FIG. 3, the robot 20 functions as a recognition unit 221, a dialogue controller 222, and a movement controller 223 by executing a control program stored in the storage device 213 in the control microprocessor 211.

The recognition unit 221 recognizes and interprets a request and feelings of the user through dialogue between the user and the robot 20. Specifically, the recognition unit 221 specifies the request of the user based on the voice data or the contents of the dialogue of the user during dialogue with the user stored in the memory 212. In addition, the recognition unit 221 interprets the feelings of the user based on information obtained by being configured of at least one or plural compositions of the behavior, the facial expressions, colors of the face, the state of the body, a tone of the voice, a speed of the voice, a heart rate of the user during the dialogue with the user stored in the memory 212. For example, the change of the colors of the face can be detected from a change of a RGB ratio of an image of the face of the user photographed by the camera 215. The recognition unit 221 detects a change in the heart rate and a body temperature of the user based on the change of the colors of the face of the user, and interprets the feelings of the user based on the detection result.

Furthermore, the recognition unit 221 interprets the voice data of the user detected by the microphone 216 and stored in the memory 212, and interprets the feelings of the user based on the tone of the voice (tone), the speed of the voice (speed of words), and the like. For the interpretation of the feelings, for example, the interpretation is performed in which "the user is happy" is interpreted from the change in the colors of the face and open conditions of the mouth, "the user is nervous" is interpreted from a change in the heart rate and conductivity of the skin, and "the user is frustrated" is interpreted from the tone of the voice and the speed of the words. The recognition unit 221 outputs information about the interpreted request and the feelings to the dialogue controller 222.

The dialogue controller 222 controls dialogue in which the robot 20 is carried out with the user and generates response content to the user. For example, a response message is generated in accordance with a dialogue content stored in the memory 212 and outputs the response message to the speaker 217. In this case, the dialogue controller 222 adjusts a volume of an output voice of the message and a speed of the speech in accordance with the feelings of the user recognized in the recognition unit 221.

The movement controller 223 generates the movement control information by which the robot 20 is moved from the current position to a target disposition position based on disposition position information of each robot 20 received from the control server 40 and information of the current position specified by the current position detecting device 219. The movement controller 223 controls an operation of the motor 218 while referring the information of the current position detected by the current position detecting device 219 and moves the robot 20.

Figure 4:
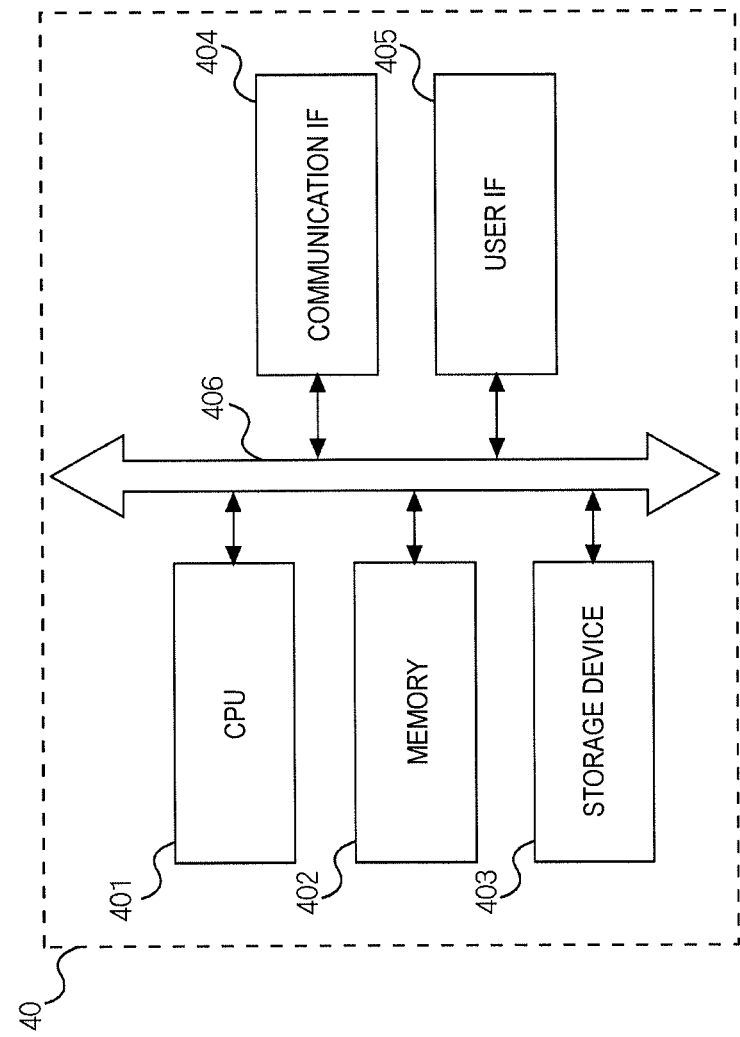
FIG. 4 is a configuration diagram illustrating hardware of a control server 40.

Next, the control server 40 of the exemplary embodiment will be described with reference to FIGS. 4 and 5. FIG. 4 is a configuration diagram illustrating hardware of the control server 40. As illustrated in FIG. 4, the control server 40 is configured to include a CPU 401, a memory 402, a storage device 403, a communication interface 404, and a user interface 405, and each thereof is connected to a control bus 406. The CPU 401 controls overall operations of each portion of the control server 40 based on a control program stored in the storage device 403. Information about the number of the persons 80 existing in each small region and characteristics of the person existing in each small region, information about characteristics of the field of each small region, the disposition position information of each robot 20 transmitted to the robot 20, and the like in the workplace 10 transmitted from the environmental sensor 30 are temporarily stored in the memory 402.

The storage device 403 is a hard disk drive (HDD), a solid state drive (SSD), or the like, and stores a control program for controlling the control server 40. Furthermore, a robot use history database, a schedule database, a conversion table, and the like which are described below are stored in the storage device 403. The communication interface 404 performs communication control in which the control server 40 performs transmitting and receiving various types of data with each robot 20, the environmental sensor 30, and the computer 70 via the access point 60. The user interface 405 is configured of a display device such as a liquid crystal display and an input device such as a keyboard and a mouse, and an administrator adjusts the control program stored in the storage device 403 using the user interface 405.

Figure 5:
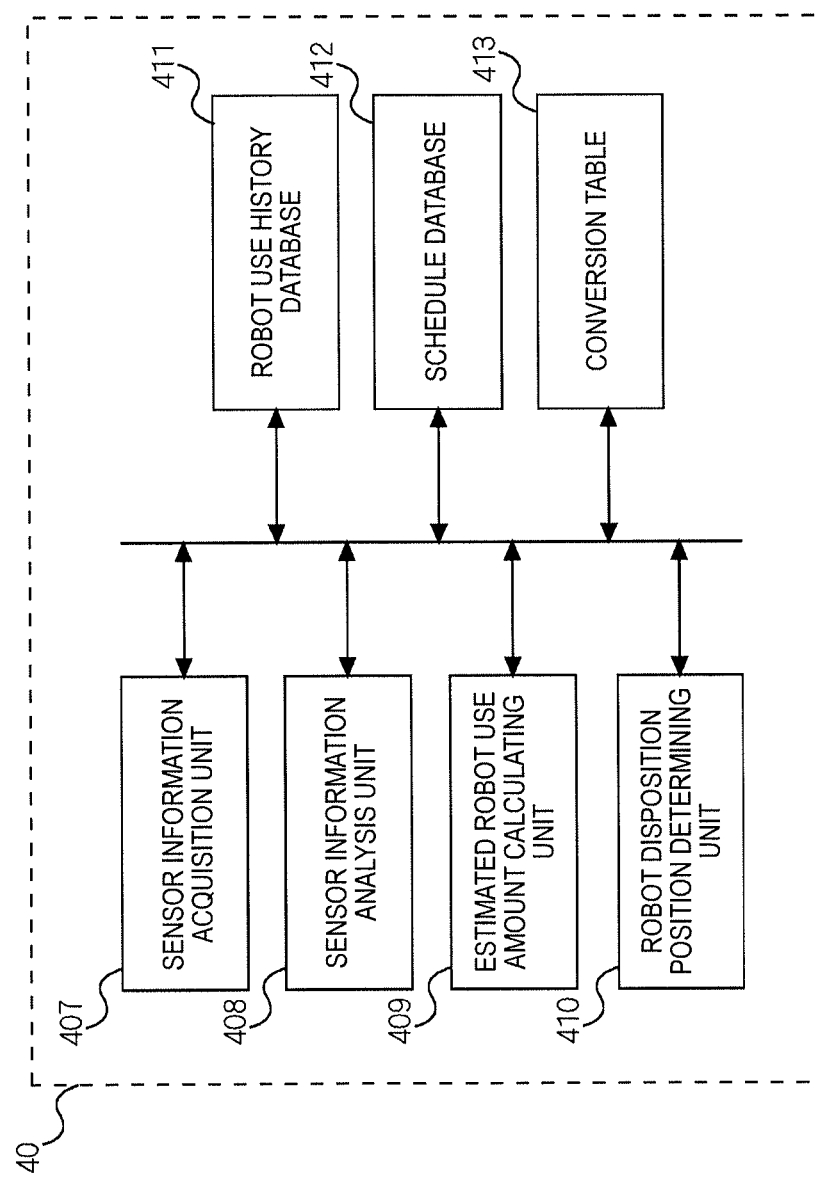
FIG. 5 is a block diagram of a function of the control server 40.

FIG. 5 is a block diagram of a function of the control server 40. As illustrated in FIG. 5, the control server 40 functions as a sensor information acquisition unit 407, a sensor information analysis unit 408, an estimated robot use amount calculating unit 409, and a robot disposition position determining unit 410 by executing the control program stored in the storage device 403 in the CPU 401. Furthermore, the control server 40 is also configured to include a robot use history database 411, a schedule database 412, and a conversion table 413. The control server 40 generates the disposition position information for dividing the workplace 10 into the plural small regions as a whole, calculating a value indicating a use possibility of the robot for each small region, and specifying each disposition position of the robot in accordance with a value thereof. Moreover, in the following description, a value indicating the use possibility of the robot is referred to as "the estimated robot use amount".

The sensor information acquisition unit 407 requests area information of a specific one small region to the environmental sensor 30 and acquires the area information of the small region from the environmental sensor 30. The area information includes the number of persons existing in the small region, person information to specify persons existing in the small region, positions and states (standing, sitting, and the like) of the persons, the voice data, and the like.

The sensor information analysis unit 408 analyzes the characteristics of the field of the small region based on the number of the persons existing in the small region, the positions and the states of the persons. For example, the sensor information analysis unit 408 interprets that "persons are in a conference" in a case where plural persons are sitting around a table and "persons are standing to talk" in a case where plural persons are standing in a close location. In addition, the characteristics of the field of the small region are specified such that "discussions are lively performed" in a case where a speech amount is large based on the voice data. In addition, the sensor information analysis unit 408 analyzes information specifying the number of persons or a population density existing a specified small region, and a person who exists in each region in a case where one environmental sensor 30 acquires the area information of a number of small regions together or in a case where sizes of small regions are respectively different.

The estimated robot use amount calculating unit 409 calculates an estimated robot use amount for each small region. Specifically, the estimated robot use amount calculating unit 409 calculates the estimated robot use amount based on the number of persons of persons existing in the small region, a value that is determined by the characteristics of a person existing in the small region, that is, a value that is determined with reference to the schedule data associated with the persons existing the small region, a value that is determined by the characteristics of the field of the small region, which are specified by the sensor information analysis unit 408. A calculating process of the estimated robot use amount by the estimated robot use amount calculating unit 409 will be described later in detail.

The robot disposition position determining unit 410 generates the disposition position information of the robots in accordance with the estimated robot use amount calculated for each small region by the description above, transmits the disposition position information to each robot 20 via the communication interface 404, and thereby each robot 20 is disposed in the disposition position in the region 10 in accordance with the disposition position information. Moreover, a robot disposition position information generating process by the robot disposition position determining unit 410 will be described later.

The robot use history database 411 saves a robot use history for each person in the workplace 10. The robot use history is data that is configured of, for example, date and time using robots, and an operating time of robots. The schedule database 412 saves the schedule data for each person in the workplace 10. The schedule data is configured of a time and a content of a schedule for each time, and is registered by using the computer 70 disposed in the workplace 10 by a user or using a portable terminal (not illustrated) that is carried by a user. The conversion table 413 is a table that is obtained by contents of schedules and values corresponding thereto, and the characteristics of the field of the small region and values corresponding thereto, and the like. Moreover, the conversion table 413 will be described later.

Figure 6:
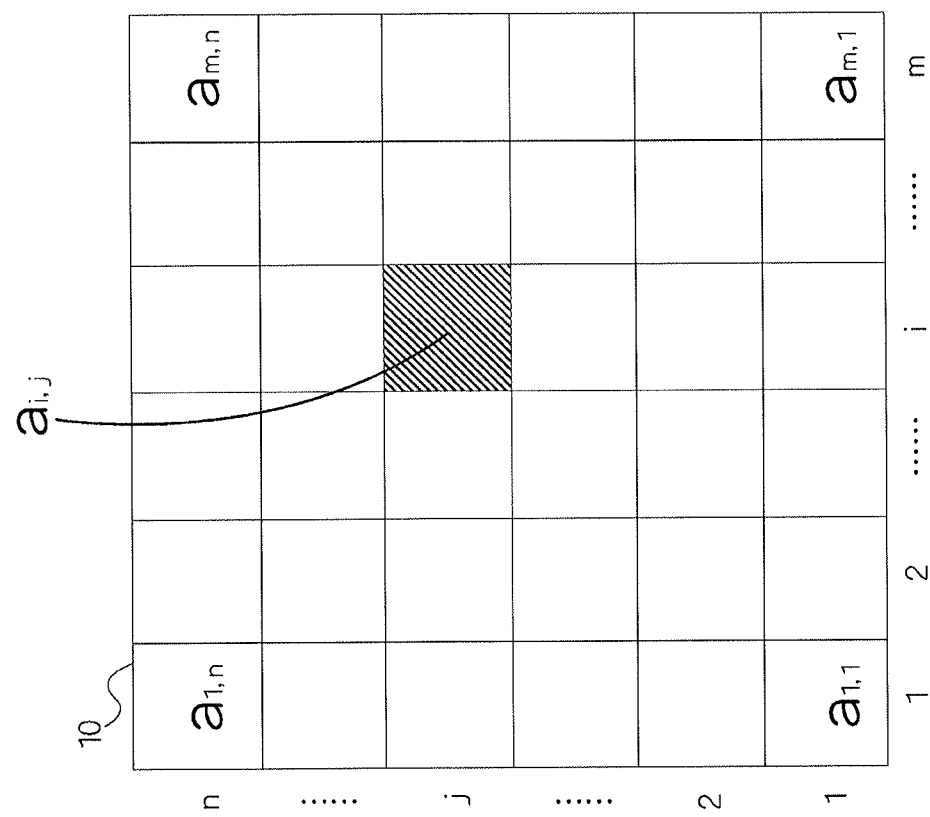
FIG. 6 is an explanatory view illustrating an example of a case where a workplace 10 is divided into plural small regions.

Next, a calculating method of the estimated robot use amount in the robot control system 100 of the exemplary embodiment will be described in detail. First, a predetermined region in the exemplary embodiment, that is, a predetermined region that is configured of one floor (one story) of an office building, that is, the workplace 10 is divided into a predetermined width and a predetermined length, and thereby the workplace 10 is divided into plural small regions a. An example thereof is illustrated in FIG. 6. In FIG. 6, one workplace 10 is divided into a total m×n of small regions $a_{1,1}, \ldots, a_{i,j}, \ldots, a_{m,n}$ by dividing into m in a horizontal direction and n in a vertical direction at equal intervals respectively. Moreover, as another method of dividing the workplace 10 into the small regions, in a case where plural rooms are provided in one floor, every one of the plural rooms may be one small region and in a case where plural desks are arranged in the floor, one desk or a number of desks, a periphery thereof may be the small region. The environmental sensors 30 are disposed on the ceiling or the wall surface of each small region one by one. Otherwise, the person information and the characteristics of the field for each small region may be analyzed in the sensor information analysis unit 408 of the control server 40 such that one environmental sensor 30 is disposed for several small regions and the environmental sensors 30 are assigned to collectively detect the person information and the field of the plural small regions. Otherwise, the plural environmental sensors 30 are disposed in one small region and information in one small region may be detected by the plural environmental sensors 30.

Figure 7:
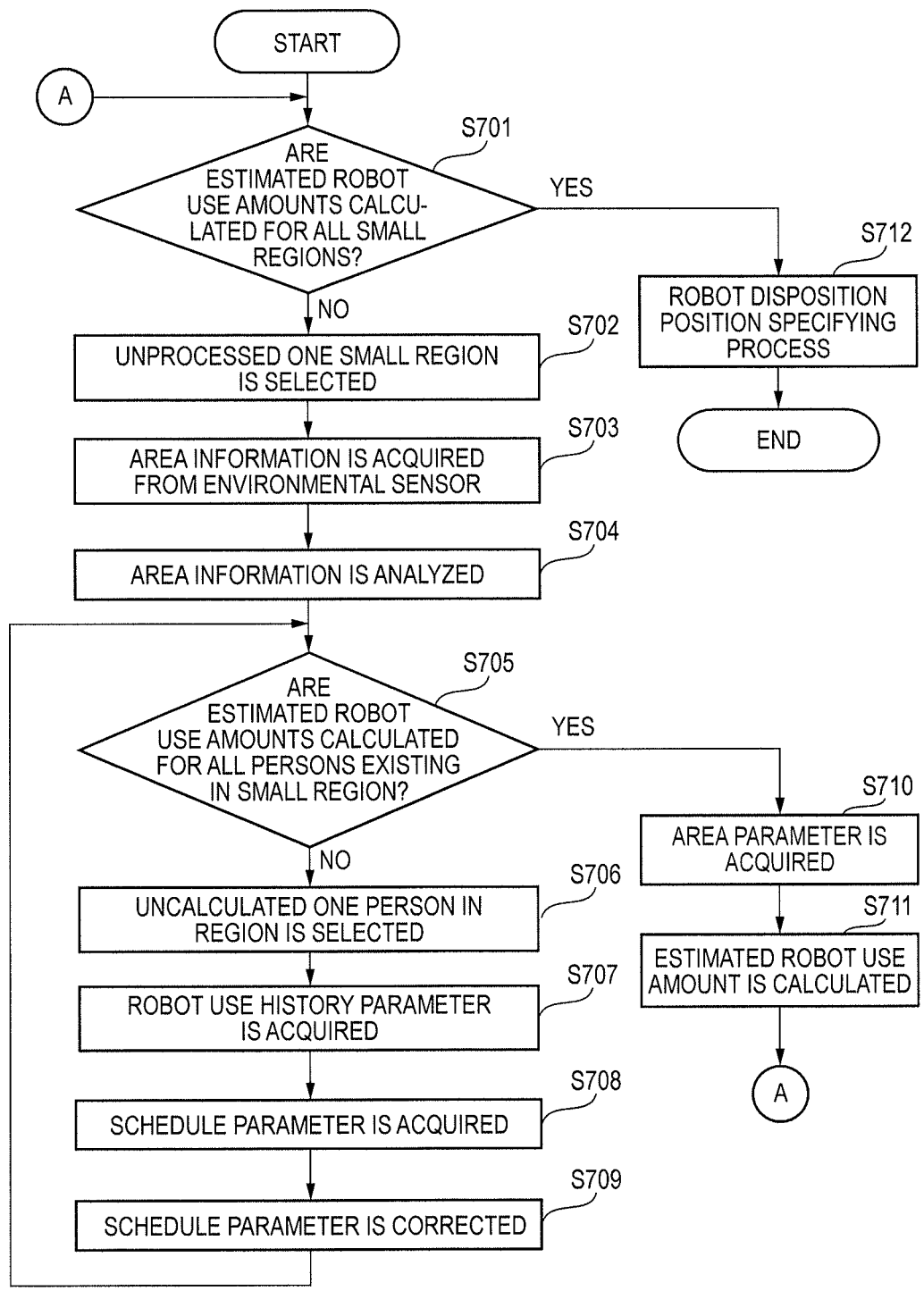
FIG. 7 is a flowchart illustrating a flow of a calculating process of an estimated robot use amount in each small region.
Figure 9:
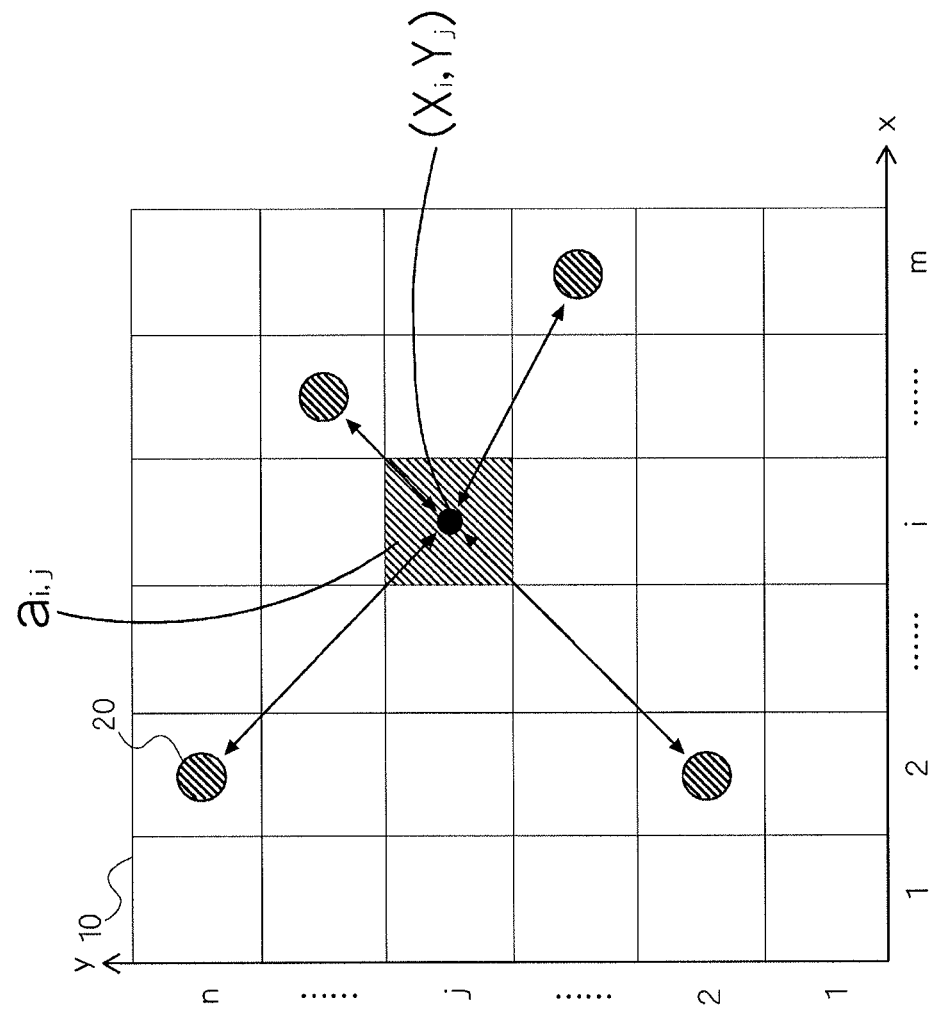
FIG. 9 is an explanatory diagram illustrating a calculating method of a robot disposition position determining process.

In the following description, in a case where the workplace 10 is divided into small regions of the total number of m×n as illustrated in FIG. 6, the calculating process of the estimated robot use amount and a robot disposition position determining process in each small region will be described with reference to FIGS. 7 to 9. Moreover, FIG. 7 is a flowchart illustrating a flow of the calculating process of the estimated robot use amount in each small region. FIG. 8 is a diagram illustrating the conversion table 413 which is referred by the estimated robot use amount calculating unit 409 during the calculating process of the estimated robot use amount. FIG. 9 is an explanatory diagram illustrating the calculating method of the robot disposition position determining process.

First, in step S701, the estimated robot use amount calculating unit 409 determines whether or not the estimated robot use amount is calculated for all the small regions $a_{1,1}$ to $a_{m,n}$ belonging to the workplace 10. In a case where the estimated robot use amount is calculated for all the small regions $a_{1,1}$ to $a_{m,n}$, the procedure proceeds to step S712 and, otherwise, the procedure proceeds to step S702. In step S702, the estimated robot use amount calculating unit 409 selects one small region $a_{i,j}$ that is a calculation object of the estimated robot use amount. In step S703, the sensor information acquisition unit 407 requests the area information to the environmental sensor 30 that is disposed in the small region $a_{i,j}$ and acquires the area information from the environmental sensor 30. The area information includes the number of persons existing in the small region $a_{i,j}$, the person information about who he is, positions and states of the persons, and the voice data. These types of the area information are temporarily stored in the memory 402 of the control server 40.

Next, in step S704, the sensor information analysis unit 408 analyzes the characteristics of the field of the small region $a_{i,j}$ based on the area information that is obtained from the environmental sensor 30. For example, a case where plural persons are sitting around a table is interpreted that "the persons are in a conference" and a case where plural persons are standing in a neighboring place is interpreted that "the persons are standing to talk". In addition, the characteristics of the field of the small region are specified such that a case where the speech amount is large based on the voice data is analyzed that "discussions are lively performed". In addition, in a case where one environmental sensor 30 collectively acquires the area information of a number of small regions, the sensor information analysis unit 408 analyzes the number of persons existing in the specific small region $a_{i,j}$, who he is, and characteristics of the field that are selected in step S702.

In successive step S705, it is determined whether or not the calculating process of the robot use amount is performed for all the persons existing in the small region $a_{i,j}$. In a case where robot use amount calculating process is completed for all the persons, the procedure proceeds to step S710 and, otherwise, the procedure proceeds to step S706. In step S706, the estimated robot use amount calculating unit 409 selects one person existing in the small region.

In step S707, the estimated robot use amount calculating unit 409 refers the robot use history for a selected person from the robot use history database 411 and acquires a robot use history parameter $\alpha^k_{history}$ using the conversion table 413.

Next, in step S708, the estimated robot use amount calculating unit 409 refers the schedule data in the time for a selected person from the schedule database 412, acquires a schedule parameter $\alpha^k_{schedule}$ corresponding to the schedule using the conversion table 413, and stores the schedule parameter $\alpha^k_{schedule}$ in the memory 402.

Here, the conversion table 413 that is referred in steps S707 and S708 described above will be described with reference to FIG. 8. The conversion table 413 is configured of a robot use amount conversion table 413A and a schedule conversion table 413B. The robot use amount conversion table 413A is a table defining a corresponding relationship between a use amount and the robot use history parameter $\alpha^k_{history}$ in the past predetermined period of the robot 20. For example, in step S707, in a case where the robot use amount for the past one month is 30 minutes based on the robot use history that is acquired by the estimated robot use amount calculating unit 409 from the robot use history database 411, the robot use amount conversion table 413A is referred and a value of "+1.0" is acquired as the robot use history parameter $\alpha^k_{history}$.

The schedule conversion table 413B is a table defining a corresponding relationship between a schedule that is specified from data registered in the schedule database 412 by a person existing in the workplace 10 and the schedule parameter $\alpha^k_{schedule}$. The schedule conversion table 413B is configured of a large item conversion table 413B-1 in which a value of a schedule parameter with respect to a rough classification of a schedule is defined and a detailed item conversion table 413B-2 in which a value of a schedule parameter with respect to a detailed schedule is defined. The large item conversion table 413B-1 includes, for example, "no schedule", "desk work", "meeting", "experiment", and the like, and a schedule parameter corresponding to each item is defined in the large item conversion table 413B-1. The detailed item conversion table 413B-2 includes a schedule that is subordinate to the rough classification and items such as "programming", "paperwork", "design", and the like with respect to "desk work" that is, for example, the rough classification, and a schedule parameter with respect to each thereof is defined in the detailed item conversion table 413B-2. For example, in step S708, in a case where a schedule is "weekly briefing" for the specific person acquired by the estimated robot use amount calculating unit 409 from the schedule database 412, first, the schedule parameter $\alpha^k_{schedule}$ is "+0.5" that is obtained by adding "+0.7" that is a value corresponding to "meeting" to "−0.2" that is a value corresponding to "weekly briefing" that is a schedule subordinate thereto.

In step S709 of FIG. 7, the value of the schedule parameter $\alpha^k_{schedule}$ for the schedule of the selected person is corrected based on the characteristics of the field of the small region that is specified in step S704. For example, in a case where the sensor information analysis unit 408 determines that "persons are in a conference" because plural persons are sitting around a table, even if there is no schedule registration in the schedule data acquired from the schedule database 412, this case is determined that a person participates in the conference and the schedule parameter $\alpha^k_{schedule}$ of the person is changed to the same value as the schedule parameters of the same conference attendees. In addition, in a case where a person whose schedule is not registered in the schedule database 412 is sitting on a desk alone, it is determined that "in the desk work", the schedule parameter is changed to "+0.2" that is a value corresponding to the desk work from initial "+0.5".

Next, the procedure returns to step S705 and it is determined whether or not a process is completed for all the persons existing in the small region $a_{i,j}$. In a case where the process is completed for all the persons, the procedure proceeds to step S710 and the estimated robot use amount calculating unit 409 sets an area parameter $\beta_{i,j}$ of the small region that is a value determined by the characteristics of the field of the small region specified in step S704.

For example, a case where plural persons are standing in a neighboring place is determined that the persons are standing to talk, ideas occur from stand talking, and there is a potential need that a robot is required to support debate. Therefore, the area parameter $\beta_{i,j}$ is set to "+0.3". Otherwise, in a case where a speaking amount is large in a place of a meeting, it is determined that debate is active and many robots are likely to be required to support the idea creation. Therefore, the area parameter $\beta_{i,j}$ is set to "+0.5".

In successive step S711, the estimated robot use amount calculating unit 409 obtains a weighting parameter $\alpha_{i,j}$ of a time t in the small region $a_{i,j}$ by the following Expression (1).

Expression 1

$$\alpha_{i,j(t)} = \sum_{k=1}^{h_{i,j(t)}} (\alpha^k_{history(t)} + \alpha^k_{schedule(t)}) + \beta_{i,j(t)} \tag{1}$$

Here, $h_{i,j(t)}$ is the number of persons in the small region $a_{i,j}$ of the time t, $\alpha^k_{history(t)}$ is the robot use history parameter of a $k^{th}$ person at the time t, $\alpha^k_{schedule(t)}$ is the schedule parameter of the $k^{th}$ person at the time t, and $\beta_{i,j(t)}$ is an area parameter of the small region $a_{i,j}$ at the time t.

For example, at the time (t), there are three persons in the small region $a_{i,j}$, the robot use amount of all three persons for the past one month is 30 minutes, a schedule of a first person is registered as "desk work" and "paperwork", a schedule of a second person is registered as "desk work" and "design", a schedule of a third person is registered as "experiment" and "electrical circuit test", and the three persons are standing to talk. In this case, first, respective robot use history parameters $\alpha^1_{schedule(t)}$ to $\alpha^3_{schedule(t)}$ of the three persons are "+1.0" with reference to the robot use amount conversion table 413A. In addition, the schedule parameter $\alpha^1_{schedule(t)}$ of the first person is "+0.2"+"+0.1"="0.3" with reference to the schedule conversion table 413B, the schedule parameter $\alpha^2_{schedule(t)}$ of the second person is "+0.2"+"+0.3"="0.5" with reference to the schedule conversion table 413B, and the schedule parameter $\alpha^3_{schedule(t)}$ of the third person is "+0.3"+"+0.0"="0.3" with reference to the schedule conversion table 413B. In addition, the area parameter $\beta_{i,j}$ in the small region $a_{i,j}$ is "+0.3". Therefore, the weighting parameter $\alpha_{i,j(t)}$ in the small region $a_{i,j}$ is "+4.4" from the above Expression (1).

Furthermore, the estimated robot use amount calculating unit 409 obtains an estimated robot use amount $\rho_{i,j}(t)$ in the small region $a_{i,j(t)}$ based on the weighting parameter $\alpha_{i,j(t)}$ by the following Expression 2 and stores the estimated robot use amount $\rho_{i,j(t)}$ in the memory 402.

Expression 2

$$\rho_{i,j(t)} = \frac{\alpha_{i,j(t)} \cdot h_{i,j(t)}}{\sum_{i=1}^{m} \sum_{j=1}^{n} \alpha_{i,j(t)} \cdot h_{i,j(t)}} \quad (2)$$

As indicated in the Expressions (1) and (2) described above, the estimated robot use amount $\rho_{i,j(t)}$ is calculated by the number $h_{i,j(t)}$ of persons and the weighting parameter $\alpha_{i,j(t)}$ of the small region $a_{i,j}$, at the time t, and the weighting parameter is calculated based on a value that is determined by the characteristics of the person existing in the small region and a value that is determined by the characteristics of the field of the small region.

Thereafter, the procedure returns to step S701 and it is determined whether or not the calculation of the estimated robot use amount for all the small regions is completed. If the calculation is completed, the procedure proceeds to a robot position specifying process of step S712 and then the process is completed.

Next, in step S712, the robot position specifying process will be described in detail. As illustrated in FIG. 9, as described above, in a case where the workplace 10 is divided into the total m×n of small regions a, center coordinates representing the specific small region $a_{i,j}$ are $X_i$, $Y_j$, the number of the same type of robots 20 disposed in the workplace 10 is R, position coordinates of the $k^{th}$ robot 20 are $x_k$, $y_k$, and an objective function L is defined by the following Expression (3).

Expression 3

$$L = \sum_{i=1}^{m} \sum_{j=1}^{n} \sum_{\ell=1}^{R} \rho_{i,j} \sqrt{(x_\ell - X_i)^2 + (y_\ell - Y_j)^2} \quad (3)$$

Next, the disposition position of the robot 20 is determined by calculating position coordinates $(x_1, y_1), \ldots (x_1, y_1), \ldots (x_R, y_R)$ of the robot in which the objective function L becomes a minimum. Moreover, in the Expression (3) described above, the disposition position of the robot 20 is calculated by using a linear distance from each robot 20 to the center coordinates of the small region, but the invention is not limited to the embodiment described above. In practice, equipments such as walls, partitions, and tables are disposed in the workplace 10 and the robot 20 cannot be necessarily moved in the linear distance. Therefore, an effective distance measured along a passage in which the robot 20 is actually moved and the like may be used for the calculation of the disposition position of the robot in place of the linear distance from each robot 20 to the center coordinates of the small region.

Figure 10:
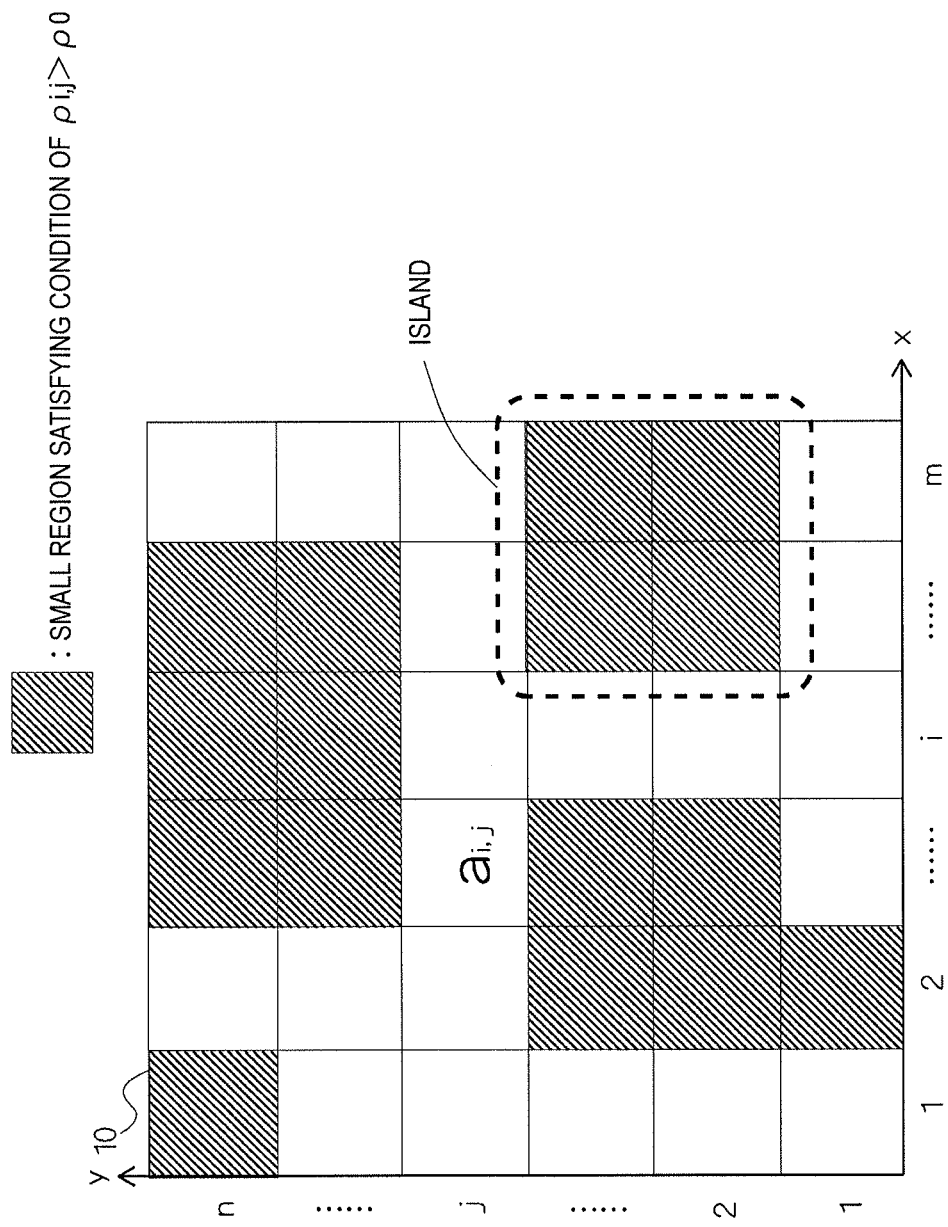
FIG. 10 is an explanatory diagram illustrating small regions by distinguishing small regions in which an estimated robot use amount $\rho_{i,j}$ in each small region is higher than a first threshold from the other small regions in which the estimated robot use amount $\rho i,j$ in each small region is not higher than the first threshold.

Next, another robot position specifying process in step S712 will be described with reference to FIGS. 10 and 11. FIG. 10 is an explanatory diagram illustrating the small regions by distinguishing small regions in which an estimated robot use amount $\rho_{i,j}$ in each small region is higher than a first threshold $\rho_0$ from the other small regions in which the estimated robot use amount $\rho_{i,j}$ in each small region is not higher than the first threshold. FIG. 11 is a flowchart illustrating another example of the robot position specifying determining process that is performed by the robot disposition position determining unit 410. As illustrated in FIG. 10, the robot disposition position determining unit 410 extracts the small region of which the estimated robot use amount $\rho_{i,j}$ in each small region is higher than the first threshold $\rho_0$, selects a number of the small regions of the number R of the robots 20 disposed in the workplace 10 in descending order of the estimated robot use amount $\rho_{i,j}$ in the extracted small regions, and in a case where the selected small regions are adjacent to each other, the adjacent small regions are collectively referred to as an "island", and the number of the robots 20 disposed in the "island" is determined in accordance with an average value of the estimated robot use amount of each small region configuring the "island".

In this case, a flow of the robot disposition position determining process will be described with reference to the flowchart of FIG. 11. In step S1101, the robot disposition position determining unit 410 extracts a small region in which the estimated robot use amount $\rho_{i,j}$ is greater than the first threshold $\rho_0$ and selects small regions by R, which is the number of the robots 20, in descending order of the estimated robot use amount $\rho_{i,j}$ in the extracted small regions. In step S1102, one of the small regions that is selected as the target in step S1101 described above is focused on in ascending order of the estimated robot use amount $\rho_{i,j}$.

In step S1103, whether or not the targeted small region is adjacent to other small regions that are selected in step S1101, that is, belongs to the "island" is determined. In a case where it is determined that the targeted small region does not belong to the "island", that is, in a case where the targeted small region is not adjacent to other small regions selected in step S1101, the procedure proceeds to step S1104, the targeted small region is determined as the disposition position of the robot 20, and the procedure proceeds to step S1108. In step S1108, it is determined whether or not the robot disposition position determining process is performed for all the small regions that are selected in step S1101. In a case where there is an unconsidered small region, the procedure returns to step S1102 and the robot disposition position determining process is repeatedly performed for the unconsidered small region. On the other hand, in a case where it is determined that the process is completed for all of the selected small regions, the procedure proceeds to step S1109. In step S1103, in a case where it is determined that the targeted small region belongs to the "island", the procedure proceeds to step S1105.

In step S1105, it is determined whether or not the "island" satisfies a condition 1, that is, the average value of the estimated robot use amount $\rho_{i,j}$ of each small region that forms one "island" exceeds a second threshold $\rho_l$ that is greater than the first threshold $\rho_0$. In a case where it is determined that the "island" satisfies the condition 1, this indicates that the robot 20 is quite likely to be used in all the small regions configuring the "island". Thus, the procedure proceeds to step S1107, each small region configuring the "island" is determined as the disposition position of the robot 20, and the procedure proceeds to step S1108. In step S1105, in a case where it is determined that the "island" does not satisfy the condition 1, this indicates that in one small region of the small regions configuring the "island" the robot 20 is unlikely to be used. Thus, the procedure proceeds to step S1106, and the robots 20 the number of which is smaller than the number of the small regions configuring the "island" are disposed in the small regions configuring the "island" in descending order of the estimated robot use amount $\rho_{i,j}$. Specifically, an integer number of the robots 20 that is obtained by rounding off a fractional part of a value that is obtained by dividing the number of the small regions configuring the "island" by γ that is a value greater than 1 are disposed in the "island". For example, in a case where the number of the small regions configuring the "island" is "5" and γ=2.0, 5/2.0=2.5 and as a result of the rounding off, three robots 20 are disposed in the "island". Thereafter, the procedure proceeds to step S1108.

In step S1108, it is determined whether or not the robot disposition position determining process is performed for all the small regions selected in step S1101 and in a case where there is an unconsidered small region, the procedure returns to step S1102 and the robot disposition position determining process is repeatedly performed for the unconsidered small region. On the other hand, in a case where it is determined that the process is completed for all the selected small regions, the procedure proceeds to step S1109. In step S1109, it is determined whether or not the disposition positions are determined for all the robots 20. In a case where the determination of the disposition positions of all the robots 20 is completed, the process is completed and, otherwise, the procedure proceeds to step S1110.

In step S1110, the number of the robots of which the disposition positions are not determined is r. In the successive step S1111, small regions the estimated robot use amount $\rho_{i,j}$ in which is greater than the first threshold and the number of which is r are selected in descending order of the estimated robot use amount $\rho_{i,j}$ and the r small regions are regarded as the targets for the small regions not selected in the operation 1 of step S1101, and the procedure returns to step S1102. The robot disposition position determining process is performed for a small region that is a new target.

The robot disposition position determining process in the workplace 10 is described above. If the disposition position of each robot is determined by the robot disposition position determining unit 410 of the control server 40, the robot disposition position determining unit 410 generates the disposition position information for each robot 20 and the generated disposition position information is transmitted to each robot 20 via the communication interface 404. Each robot 20 generates the movement control information by which the robot 20 is moved from the current position to each disposition position based on the disposition position information received from the control server 40 and is moved to the disposition position. The disposition positions of the robots 20 are predetermined positions in each small region a. Moreover, the robot disposition position determining process described above is performed for each predetermined time and thereby the disposition position information of each robot 20 is updated. Therefore, the disposition positions of the robots 20 may be changed for each predetermined time. Otherwise, the robot disposition position determining process described above is performed in a case where the environmental sensors 30 detect that rapid movement of the persons 80 occur in the workplace 10. Therefore, the disposition position information of each robot 20 is updated and the disposition positions of the robots 20 may be changed.

Moreover, in the embodiment described above, an example in which the number of persons and the specification of the persons existing in the small regions of the workplace 10 are performed by the environmental sensors 30 is described, but the invention is not limited to the method. In addition, wireless communication devices (for example, those that generate radio such as a card with a built-in beacon transmitter) are worn on the bodies of the persons 80 performing business in the workplace 10, are received by the access point 60 or a beacon receiver, and thereby the position coordinates and personal information of the persons 80 may be acquired. In addition, accurate position information of the persons 80 is not necessary to be acquired and, for example, the beacon receiver is disposed in each small region a of the workplace 10, and the number and the personal information of persons in the vicinity of the beacon receiver may be acquired depending on performance of the wireless communication device.

In addition, in a case where plural computers 70 are disposed in the workplace 10, if the computers 70 are disposed in fixed positions, the specification of the number of the persons and an individual existing in each small region a can be performed by collecting log-on information to the computers 70 by the control server 40.

Moreover, in the exemplary embodiment described above, an example in which each disposition position of the robot 20 is a predetermined position in each small region a when the robot 20 is disposed in each disposition position is described, but in addition thereto, for example, a place in which the minimum number of the persons (population density) is positioned in each small region may be the disposition position of the robot 20 from information of furniture (desk, wall, or the like) stored in the control server 40 in advance and information about the positions of the persons which are detected by the environmental sensors 30 in real time. In addition, the maximum number of the robots 20 which are able to be disposed in the disposition positions of the robots in each small region may be set in advance. In addition, the maximum number thereof can be changed depending on the types and the sizes of the robots 20, and the like.

Furthermore, in the exemplary embodiment described above, a case where the sizes of the small regions a are equal to each other is described. However, the sizes of the small regions a may be different from each other. In this case, in the Expressions (1) and (2), the estimated robot use amount may be calculated using the population density instead of the number of the persons in the small region.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. A robot control system comprising:
plural robots that are disposed in a region;
a generating unit that generates disposition position information based on a value indicating a use possibility of a robot in each of plural small regions that are included in the region, the value is determined with reference to schedule data of a person present in the each of the plural small regions and characteristics of a field associated with the each of the plural small regions; and
a disposition unit that disposes the plural robots in accordance with the disposition position information.
2. The robot control system according to claim 1, wherein the generating unit calculates the value indicating the use possibility of a robot based on a population density of the small region, a value that is determined by a characteristic of the person present in the small region, and a value that is determined by a field characteristic of the small region.

3. The robot control system according to claim 2, wherein the value that is determined by the characteristic of the person present in the small region is determined based on a robot use history of the person and/or schedule data of the person.

4. The robot control system according to claim 2, further comprising
an environmental sensor,
wherein the value that is determined by the field characteristic of the small region is determined based on a state of the small region detected by the environmental sensor.

5. The robot control system according to claim 1, wherein the generating unit generates disposition position information for determining disposition positions of each of the plural robots such that the total sum of products, for each small regions, of a distance from the small region to each of the disposition positions of the plural robots and the value indicating the use possibility of a robot in the small region becomes a minimum.

6. The robot control system according to claim 5, wherein the distance from the small region to each of the disposition positions of plural robots is a linear distance or an effective distance.

7. The robot control system according to claim 1, wherein the generating unit generates the disposition position information such that
small regions in which the value indicating the use possibility of a robot exceeds a first threshold are selected from among the plural small regions of the region by a number of the plural robots disposed in the region in descending order of the value indicating the use possibility of a robot,
in a case where a small region in the selected small regions is not adjacent to other small region in the selected small regions, the small region not adjacent to the other small region in the selected small regions is determined as the disposition position of the robots,
in a case where a small region in the selected small regions is adjacent to other small region in the selected small regions and an average value of the values indicating the use possibility of a robot in the small region and the other small region adjacent to the small region exceeds a second threshold that is greater than the first threshold, each of (a) the small region being adjacent to the other small region in the selected small regions and (b) the other small region is determined as a disposition position in which one robot is disposed, and
in a case where a small region in the selected small regions is adjacent to other small region in the selected small regions and the average value is equal to or less than the second threshold, one of the plural robots, a number of which is smaller than a total number each of the small region being adjacent to the other small region in the selected small regions and the other small region are disposed in the small region being adjacent to the other small region in the selected small regions and the other small region.

8. The robot control system according to claim 1, wherein the generating unit updates the disposition position information periodically.

9. The robot control system according to claim 1, wherein the generating unit updates the disposition position information in a case where a rapid movement of a person occurs in the region.

10. A non-transitory recording medium storing a program causing a computer to execute a process comprising:
generating disposition position information based on a value indicating a use possibility of a robot in each of plural small regions that are included in a region, the value is determined with reference to schedule data of a person present in the each of the plural small regions and characteristics of a field associated with the each of the plural small regions; and
disposing plural robots in accordance with the disposition position information.

* * * * *